United States Patent [19]

Brashears et al.

[11] Patent Number: 5,252,124
[45] Date of Patent: Oct. 12, 1993

[54] CONVERTIBLE ASPHALT AND SOIL REMEDIATION PLANT AND METHODS OF OPERATION

[75] Inventors: David F. Brashears, Belle Isle; Edward D. Curtis, Lakeland, both of Fla.

[73] Assignee: Thermotech Systems Corporation, Orlando, Fla.

[21] Appl. No.: 822,283

[22] Filed: Jan. 21, 1992

[51] Int. Cl.$^5$ .......................................... C09D 195/00
[52] U.S. Cl. ................................ 106/281.1; 588/209; 588/228
[58] Field of Search ..................... 106/281.1; 588/209, 588/228

[56] References Cited

U.S. PATENT DOCUMENTS 5,164,158  11/1992  Brashears et al. ................ 422/1

Primary Examiner—David Brunsman
Attorney, Agent, or Firm—Nixon & Vanderhye

[57] ABSTRACT

A materials-handling plant is convertible for producing asphalt by either batch or continuous drum mix processes or remediating soil. Common to each process is a rotary drum and burner system for heating the materials, a primary separator and a baghouse for separating particulate matter from exhaust gas streams. For asphalt production by a batch process, aggregate is dried in the drying section of the drum and discharged for combination with asphalt in a batch tower. In the continuous drum mixer mode of asphalt production, dried aggregate is discharged into a drum mixing section for mixing with asphalt and recycle asphalt and conveyed to a storage silo. In both cases, particulate dust is separated from the exhaust gas stream and combined with the resulting asphalt product. For soil remediation, the contaminants in the soil are volatilized in the drum by contact with the hot gases of combustion. Dust particles in the exhaust gas stream are separated and contaminants thereon volatilized in the baghouse. The contaminant-free particles are recombined with the remediated soil in a mixer/cooler. The resulting exhaust gas stream is subjected to elevated heat to volatilize any residual contaminants.

4 Claims, 2 Drawing Sheets

CONVERTIBLE ASPHALT AND SOIL REMEDIATION PLANT AND METHODS OF OPERATION

BACKGROUND AND SUMMARY OF THE INVENTION

The present invention relates to a materials-handling plant which can be alternately converted and operated to produce asphalt and remediate contaminated soil. Particularly, the present invention relates to a materials-handling plant which, in the production of asphalt, can be converted between a batch plant and a high-capacity drum mix plant and, when operating as a soil remediation plant, can treat and remediate contaminated soils, particularly those containing hydrocarbon products and hydrocarbon chemicals such as PCBs, in a thermally efficient, environmentally compatible and safe manner.

In the production of asphalt, a single production plant will typically consist of either a batch plant or a high-capacity drum mix plant. In a batch plant, aggregate is disposed in a rotatable drum and a burner supplies hot gases of combustion within the drum, typically in counterflow relation to the direction of flow of the aggregate, to dry the aggregate. The dried aggregate is then discharged from the drum into a batch tower. In the batch tower, the aggregate is sized and then combined with hot asphalt in a mixing section for delivery to a truck for transportation to the job site.

In a typical drum mix plant, the dried aggregate is emptied from the drying section of the drum into a contiguous drum mixing section. In the mixing section, dried aggregate, asphalt, recycled asphalt material, if added, and mineral filler are mixed to form the hot mix asphalt product. The hot mix section of the drum is closed and vapors, including any blue smoke and odors, are recycled into the burner, where they are incinerated and converted into fuel. The hot mix is then discharged from the drum for delivery to a truck or to a storage silo for later delivery to the job site.

In both cases, exhaust gases from the drum are passed through a primary collector for separating the large particles from the exhaust gas stream, the latter then passing into a baghouse for further separation of the finer particles from the exhaust gas stream. The particles collected from the primary separator and the baghouse are returned to the mixing section of the drum mixer or to the hot aggregate elevator tower in the batch plant.

The advantages of both continuous drum mix and batch plant operations have been recognized and combined in a single plant. Thus, for the plant to operate in a batch mode, the aggregate is dried in the drum and removed to the batch tower, where it is mixed with the asphalt. The particulate material separated out by the primary collector and baghouse may be added to the drum mixer. When it is desired to operate the plant in a drum mix mode, the aggregate is dried as usual and then discharged into the contiguous mixer section of the drum for mixing with asphalt. The hot asphalt mix is then discharged from the drum mixer and conveyed along a conveyor into a hot mix storage silo. Thus, by providing a drum having both batch and drum mixing capability, as well as equipment for batch operations, i.e., the hot elevator tower and batch tower, and for drum mixing operation, i.e., a slat conveyor and storage silo, the advantages of both batch and drum mixing operations have been achieved in a single asphalt plant.

It has now been recognized according to the present invention that processes and equipment for the treatment of contaminated soils, for example, those soils containing hydrocarbon products and hydrocarbon chemicals such as PCBs, have certain similarities with the foregoing described processes and equipment for the production of asphalt. Such equipment and processes are described, for example, in co-pending patent application Ser. No. 07/627,243 in which there is disclosed apparatus and methods for remediating contaminated soils, including a rotating drum for receiving the hydrocarbon-contaminated soil. By operating the drum within certain temperature limitations, the hydrocarbons within the soils can be oxidized within the drum. Thus, as set forth in the above-mentioned U.S. patent application, contaminated soil is supplied the upper end of an inclined rotating drum and hot gases of combustion are supplied the opposite end, whereby the contaminated soil is remediated by volatilization of the contaminants. The clean soil is discharged from the drum for disposition into a mixer cooler, where the remediated soil is mixed with water and other particulate material recombined with the soil, as described below. The exhaust gases from the drum are passed through a primary collector and then through a baghouse for separation of the particulate matter from the gases. The separated particulate matter is separately remediated in the baghouse, for example, by the system described and illustrated in co-pending application Ser. No. 07/627,243, filed Dec. 14, 1990, the subject matter of which is incorporated herein by reference. That remediated particulate matter may be conveyed to the mixer cooler for combination with the remediated soil from the drum. The gases from the baghouse are then passed through a thermal oxidizer where any residual contaminants are oxidized. The gases from the baghouse are, however, first placed in heat exchange relation with the exhaust gases from the thermal oxidizer for thermal efficiency purposes.

It has been discovered according to the present invention that a single materials-handling plant can be provided which can be converted for either of the aforedescribed two different types of asphalt production operations as well as a plant for soil remediation. That is to say, using equipment common to each of the three processes and additional equipment as necessary to each of the processes, the single plant may be converted for soil remediation or asphalt production either by continuous drum mix or batch processes. To achieve the foregoing, the major elements of the single plant hereof for use in soil remediation and the production of asphalt as described are the following: (a) a drum/-mixer; (b) a hot aggregate elevator and batch tower; (c) a hot mix storage silo and associated conveyor; (d) a primary separator and a baghouse, collectively sometimes called a separator; (e) a mixer cooler; and (f) a thermal oxidizer, together, of course, with associated conveyors, controls, ducting and the like.

To operate this system in a batch mode for the production of asphalt, aggregate is introduced into the drum and dried by contact with the hot gases of combustion from the drum burner. The aggregate is discharged from the drum and conveyed by the elevator into the batch tower for sizing and mixing with hot asphalt. For operation as a drum mixer plant, the aggregate is introduced into the drum, dried, and is then discharged into the drum mixing section, where the dried aggregate is combined with asphalt, recycle asphalt and other material. The hot mixed asphalt is then conveyed to the storage silo for subsequent use. In both cases, the primary collector and baghouse are used to separate particulate matter from the exhaust gases of the drum and convey the particulate matter to the batch tower or into the hot mixing zone of the drum when in the drum mixing mode. To employ this system as a soil remediation plant, the contaminated soil is introduced into the drum and the hot gases of combustion volatilize the contaminants. The remediated soil is discharged from the drum into the mixer cooler where water is applied to the remediated soil. The exhaust gases from the drum flow through the primary collector and the baghouse similarly as in asphalt production. The particulate material separated out in the primary collector and the baghouse is treated at high temperature to volatilize remaining contaminants by mixing with the remediated soil and in the mixer cooler being blended with the remediated soil. The hot gases leaving the baghouse, however, are passed through a thermal oxidizer to oxidize the contaminants in the gases. Before exhausting the gases exiting the thermal oxidizer, they are placed in heat exchange relation with the incoming gases from the baghouse to afford thermal efficiency to the process.

In a preferred embodiment according to the present invention, there is provided a materials handling plant having a rotatable drum, a burner for flowing hot gases of combustion through the drum for drying material in the drum, a separator for separating out particulate material in gases exhausted from the drum, a thermal oxidizer for oxidizing residual contaminants in the gases exhausted from the separator, means for mixing material dried in the drum with asphalt to form an asphalt mix and a means for combining particles separated from the exhaust gases and material from the drum, a method of operating the plant for alternately producing an asphalt mix and remediating contaminated soil, comprising the steps of (a) when the plant is operated to produce an asphalt mix, (i) supplying material in the form of aggregate to the drum, (ii) drying the aggregate within the drum, (iii) flowing particulate-laden gases from the drum through the separator for separation into an exhaust gas stream and a particle stream; (iv) returning the particles of the particle stream to the aggregate, and (v) combining the aggregate with asphalt to produce an asphalt mix and (b) when the plant is operated to remediate contaminated soil, (i) supplying material in the form of contaminated soil to the drum, (ii) heating the soil in the drum to volatilize the contaminants, (iii) flowing particulate-laden gases from the drum through the particle separator for separation into a first exhaust gas stream and a first particle stream, (iv) subjecting the particles of the first particle stream to an elevated temperature sufficient to volatilize residual contaminants and provide contaminant-free particles, (v) combining the heated soil and contaminant-free particles and (vi) passing the first exhaust gas stream through a thermal oxidizer to destroy residual contaminants, leaving a substantially clean exhaust gas stream.

In a further preferred embodiment according to the present invention, there is provided a materials-handling plant comprising a rotatable drum and a burner for flowing hot gases of combustion through the drum, the rotatable drum having a drying section and a mixing section downstream from the drying section in the direction of material flow, a primary separator for separating out particulate material in gases exhausted from the drum, a baghouse for separating fine particulate material in gases exhausted from the primary separator and a thermal oxidizer for oxidizing contaminants in gases exhausting from the baghouse. Means are provided for mixing aggregate material and asphalt to form an asphalt mix and a mixer/cooler for receiving soil discharged from the drying section of the drum and mixing the discharged soil with water.

Accordingly, it is a primary object of the present invention to provide apparatus and methods in a single plant for alternately remediating contaminated soil and producing asphalt either by continuous drum mix or batch processes.

These and further objects and advantages of the present invention will become more apparent upon reference to the following specification, appended claims and drawings.

BRIEF DESCRIPTION OF THE DRAWING FIGURES

FIG. 1 is a schematic perspective view with parts broken out for illustrative purposes of a convertible plant according to the present invention; and FIG. 2 is a schematic plan view thereof.

DETAILED DESCRIPTION OF THE DRAWING FIGURES

Figure 1:
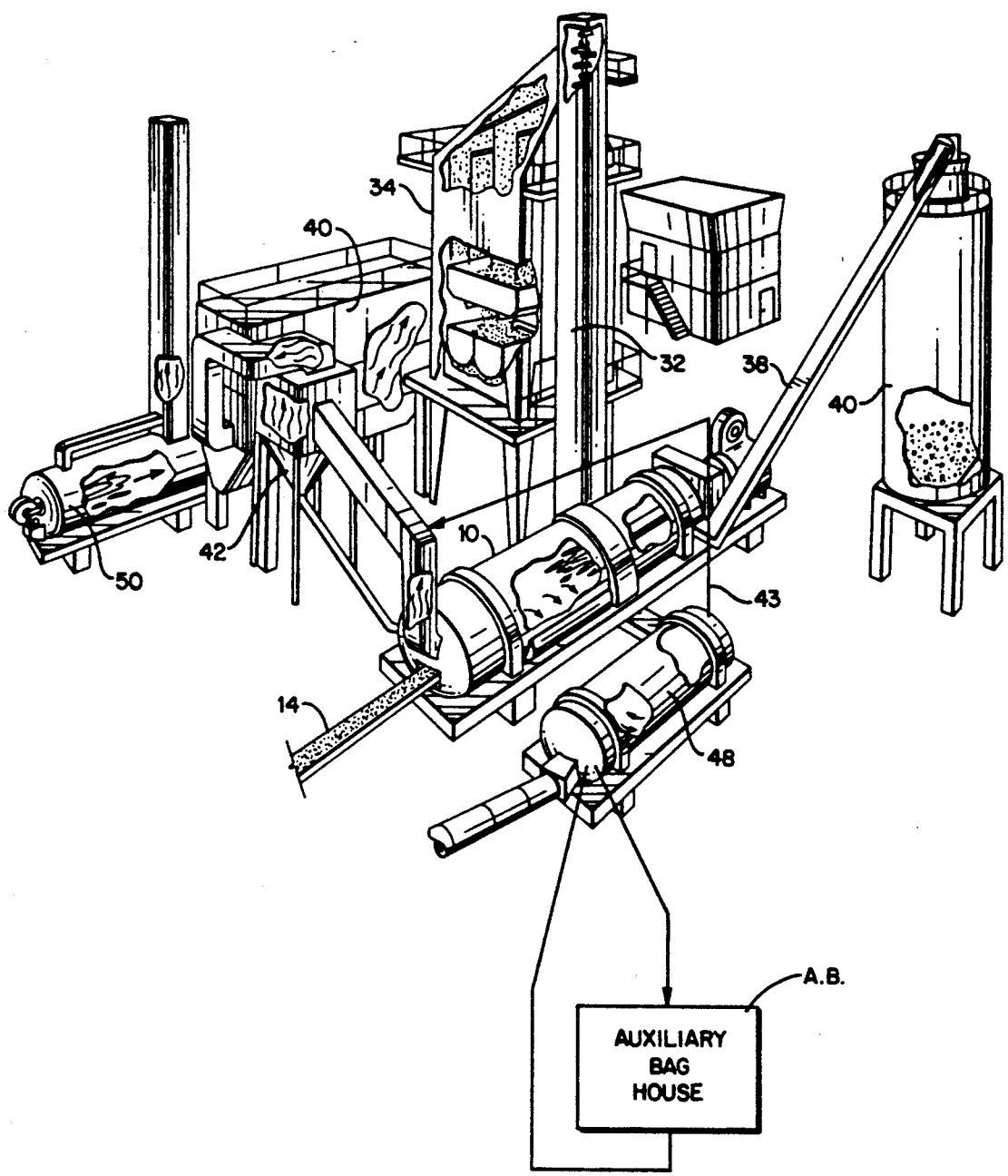
Figure 2:
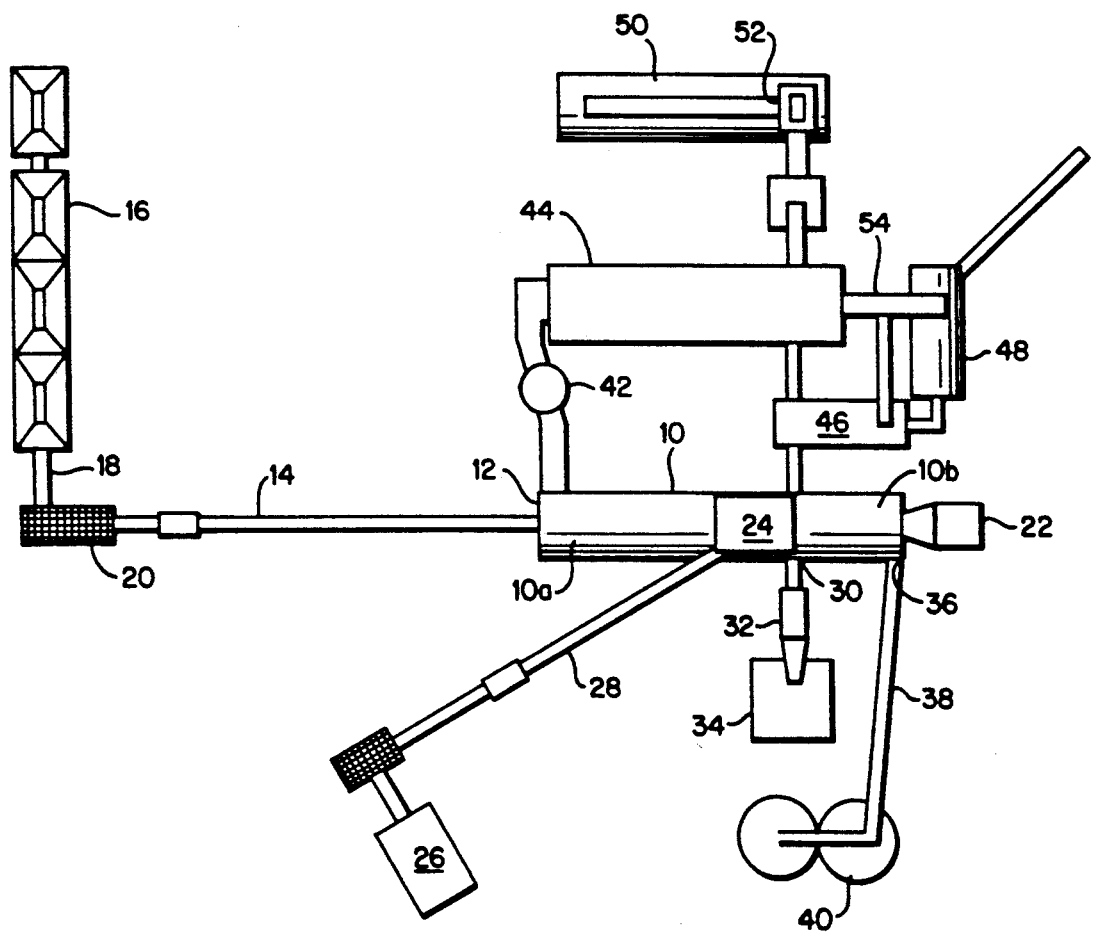

Reference will now be made in detail to a present preferred embodiment of the invention, an example of which is illustrated in the accompanying drawings.

Referring now to the drawing figures, there is illustrated a materials-handling plant for conversion between three modes of operation: (1) asphalt production by a batch process; (2) asphalt production by a drum mix process; and (3) remediation of soils contaminated by hydrocarbons. The plant includes a drum/mixer 10, which may be of the type disclosed in U.S. Pat. No. 4,892,411, dated Jan. 9, 1990, of common assignee herewith, the disclosure of which is incorporated herein by reference. Drum/mixer 10 includes an elongated drying section 10a and a mixing section 10b downstream from the drying section 10a in the direction of aggregate flow. Drum 10 is typically inclined to the horizontal, with the upper end constituting a feed inlet 12 for receiving aggregate or contaminated soil, depending upon the use to which the drum is put. Thus, the material may be conveyed into inlet 12 along a conveyor 14, in the case of soil remediation, from cold feed bins 16, a collecting belt 18, and a vibrating screen 20. At the opposite end or lower end of the drum 10, there is provided a burner 22. Burner 22 has burner tubes, not shown, which extend through the mixer section 10b such that the flame from the burner is extant at the lowermost portion of the drying section 10a but is shielded from the mixer section 10b. The hot gases of combustion thus flow preferably in countercurrent relation to the direction of the flow of the aggregate along the drum. The drum typically has internal flights for veiling the material in the drum to improve the efficiency of the heat transfer between the hot gases of combustion and the material. Adjacent the intersection of the drying section 10a and the mixing section 10b, a recycle inlet opening is provided for introducing recycle asphalt material into the drum when the drum is operating in the continuous drum mix mode. This recycle inlet opening is designated 24 and recycle material may be supplied from a recycle bin 26 by a scale conveyor 28. Similarly adjacent that intersection, there is provided a discharge opening for removing material, e.g., dried aggregate, from the dryer section 10a of drum 10 when it is used in a batch mode for asphalt production or remediated soil when the drum is used for soil remediation. The discharge is generally designated 30 and, for asphalt production, communicates by way of a conveyor with an elevator 32 for discharging the superheated dried aggregate into a batch tower 34. As those skilled in the art will understand, batch tower 34 sizes the heated aggregate and mixes the aggregate on demand with asphalt to provide an asphalt mix on a batch basis. The discharge may also be diverted to discharge soil onto a conveyor for transport to a mixer cooler, as described hereinafter.

At the lowermost downstream end of drum 10 and adjacent the downstream end of mixer section 10b, there is provided a hot mix discharge 36 for discharging hot mix from the drum mixer when the plant is operated in the drum/mixing mode. It will be appreciated that the mixer section 10b of drum 10 includes piping for receiving hot asphalt and other materials for mixing with the dried aggregate whereby a hot mix is formed in the mixing section 10b. The hot mix may be discharged through discharge 36 for conveyance, e.g., by a slat conveyor 38, into storage silos 40.

The hot gases of combustion exhausting from the upstream end of drum 10 pass first through a primary collector or separator 42 and then pass into a baghouse 44 for further separation. Depending upon whether a batch or drum/mixing asphalt production mode is employed, the separated particles in the primary separator 42 are delivered to hot elevator 32 or the mixing section 10b of the drum/mixer, respectively. Similarly, any particles collected from the baghouse 44 may be likewise disposed. When operating the plant for asphalt production, the baghouse finally cleans the exhaust gases of particulate matter whereby the clean exhaust gases may exit through a stack, not shown.

In addition to the foregoing equipment, the plant includes a dust conditioner 46 and a mixer cooler 48. The dust conditioner and mixer cooler are in communication with the discharge from drum 10 at the end of the dryer section 10a whereby the remediated soil may be transported through the dust conditioner into the mixer cooler. Additionally, there is provided a stack diverter valve, not shown, for diverting the exhaust gases from the baghouse 44 from the stack for flow into a thermal oxidizer 50. The thermal oxidizer oxidizes the contaminants in the soil particles whereby the exhaust gases from the oxidizer are contaminant-free. The contaminant-free exhaust gases, however, before going through the thermal oxidizer stack into the atmosphere, are placed in heat exchange relation in a heat exchanger 52 with the gases exiting the baghouse 44 for flow to the thermal oxidizer. This heat exchange relation raises the temperature of the gases entering the thermal oxidizer for purposes of thermal efficiency. The dust collected from the primary collector and the baghouse is passed through a conditioning system within the baghouse, as set forth in the aforementioned prior U.S. patent application Ser. No. 07/627,243. The remediated dust exits the baghouse via a conveyor 54 for combining with the remediated soil in the mixer cooler 48.

In using the apparatus hereof, the operator of the plant determines whether the plant will be used to produce asphalt by either the batch or continuous drum mix mode or to remediate soil. When used in the batch mode for the production of asphalt, aggregate is introduced into inlet 12 and dried by contact with the hot gases of combustion flowing countercurrently therewith in the drying section 10a of drum 10. The dried aggregate is discharged from the drum at discharge 30 at a temperature within a range of 200° F. to 400° F. and typically about 300° F. The discharged dried aggregate is conveyed by elevator 32 into batch tower 34. Within batch tower 34, the dried aggregate is screened into the selected sizes and mixed with hot asphalt for subsequent delivery to the job site. The hot gases of combustion exiting the drum 12 and having a temperature within a range of 200° F. and 400° F. pass through the primary collector 42 and baghouse 44. The separated particles from the aggregate are delivered via a conveyor to the elevator 32 for recombination with the dried aggregate in the batch tower.

If asphalt production by the continuous drum mix mode is selected, aggregate is disposed in the drum 10 via inlet 12 for drying in the drying section 10a. The dried aggregate is then discharged through a divider plate within the drum into the drum mixing section 10b. In the drum mixing section 10b, the dried aggregate is combined with asphalt. Recycled asphalt may be added via the recycle conveyor 28 for combination with the dried aggregate and new asphalt to form the hot mix. The hot mix temperature would generally range from 200° F. to 400° F. with a typical temperature of about 300° F. The hot mix is discharged at 36 and conveyed into storage silos 40 for subsequent delivery to a job site. The hot gases of combustion exit the drum 10 at a temperature within a range of 200° F. to 400° F. for passage through the primary collector 42 and baghouse 44. The particles separated out from the particle exhaust stream from the drum are recombined with the aggregate in the mixing section 10b. Residual gases in the hot mix section of the drum are conveyed via conduit 43 to the primary collector and baghouse.

If the materials plant is selected for use as a soil remediation plant contaminated soil is conveyed into drum 10 via inlet 12. The veiling action within the drying section of the drum caused by the flights subjects the contaminated soil to a very high temperature, particularly adjacent the burner and immediately prior to being discharged through the soil discharge outlet 30. The soil discharge temperature typically lies within a range of 400° F. to 800° F. and, with some higher organics, may have to be as high at 1000° F. The heated soil is conveyed into the dust conditioner and mixer cooler 46 and 48, respectively. The particulate dust from the burner exhaust gas stream in drum 10 contains contaminants and must therefore be treated prior to release to the atmosphere. The dust flows into the primary collector 42 which separates the relatively large particles from the dust stream and enables the particles to fall to the bottom, for example, of a conical section of the cyclone separator 42. As in prior application Ser. No. 07/627,243, the large particles separated out in the primary collector 42 are conveyed by a screw conveyor into the bottom of the baghouse 44. The remaining exhaust gases and particulate dust exiting the primary collector 42 and are discharged into the baghouse 44. In baghouse 44, the remaining dust is separated from the exhaust gas stream and flows toward the bottom of the baghouse for treatment with the large particles conveyed from primary collector 42. As explained in the prior application, a portion of the hot gases from thermal oxidizer 50 are transmitted into the dust oven in the lower portion of the baghouse 44. The particles are thus subjected in the lower portion of the baghouse to an elevated temperature sufficient to volatilize any hydrocarbons which have been condensed on these dust particles. The now contaminant-free dust particles are combined with the heated soil in the mixer/cooler 48 via conveyor 54. A water spray is provided in the cooler section of the mixer/cooler whereby the temperature of the remediated soil is lowered.

The mixer/cooler is a cylindrical rotary device with a center transfer wall in the middle. In the first section of the mixer/cooler, the very hot aggregates from the dryer and dust from the primary collector and baghouse are mixed. Any residual hydrocarbons in the dust are then volatilized, and exhaust from the inlet end breaching back to the primary collector. In this way, the dust is remediated. The dust and aggregates that are mixed together then are transported through this center wall in the inside of the mixer/cooler into the cooler section. In the cooler section, the aggregates and dust are mixed with water to cool the material and rehydrate it. In this process, there is a considerable amount of steam generated, which would under the best application be taken to a separate auxiliary baghouse A.B. The steam should be clean except for the dust that may be carried with the steam, and this dust would then be returned to the mixer/cooler for re-entrainment into the discharge stream. It is important in the operation of the unit that in the mixer/cooler the pressure maintained in the mixer section be slightly more negative than the pressure in the cooler section. In this respect, if there is any leakage between the two sections, it will consist of steam which is carried back into the mixer section rather than contaminated volatilized organics carried into the cooler section.

The exhaust gases in the baghouse, cleansed of the dust, may still contain contaminants. Accordingly, the exhaust gases are directed to the thermal oxidizer 50 for volatilization of residual hydrocarbons. The inflow of exhaust gases from the baghouse 44 is placed in heat exchange relation with the exhaust gas from the thermal oxidizer in the heat exchanger 52 for thermal efficiency purposes. The exhaust gases from the thermal oxidizer are thereafter exhausted to the stack.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a materials handling plant having a rotatable drum, a burner for flowing hot gases of combustion through the drum for drying material in the drum, a separator for separating out particulate material in gases exhausted from the drum, a thermal oxidizer for oxidizing residual contaminants in the gases exhausted from said separator, means for mixing material dried in the drum with asphalt to form an asphalt mix and a means for combining particles separated from said exhaust gases and material from said drum, a method of operating said plant for alternately producing an asphalt mix and remediating contaminated soil, comprising the steps of:
    (a) when said plant is operated to produce an asphalt mix, (i) supplying material in the form of aggregate to the drum, (ii) drying the aggregate within the drum, (iii) flowing particulate-laden gases from the drum through the separator for separation into an exhaust gas stream and a particle stream; (iv) returning the particles of the particle stream to the aggregate, and (v) combining the aggregate with asphalt to produce an asphalt mix; and
    (b) when said plant is operated to remediate contaminated soil, (i) supplying material in the form of contaminated soil to said drum, (ii) heating the soil in the drum to volatilize the contaminants, (iii) flowing particulate-laden gases from the drum through the particle separator for separation into a first exhaust gas stream and a first particle stream, (iv) subjecting the particles of said first particle stream to an elevated temperature sufficient to volatilize residual contaminants and provide contaminant-free particles, (v) combining the heated soil and contaminant-free particles and (vi) passing the first exhaust gas stream through a thermal oxidizer to destroy residual contaminants, leaving a substantially clean exhaust gas stream.

2. A method according to claim 1 including in step (a) mixing the asphalt and the aggregate in the drum to form a hot asphalt mix.

3. A method according to claim 1 including a batch tower for mixing asphalt and dried aggregate and including in step (a) mixing the asphalt and dried aggregate in the batch tower.

4. A method according to claim 1 including in step (b) conditioning the combined heated soil and particles of the first particle stream in the combining means by applying water thereto.

* * * * *